Aug 9, 1938.   C. BLATCHFORD   2,126,165
METHOD OF AND MEANS FOR MARKING A HIGHWAY
Filed Nov. 13, 1936
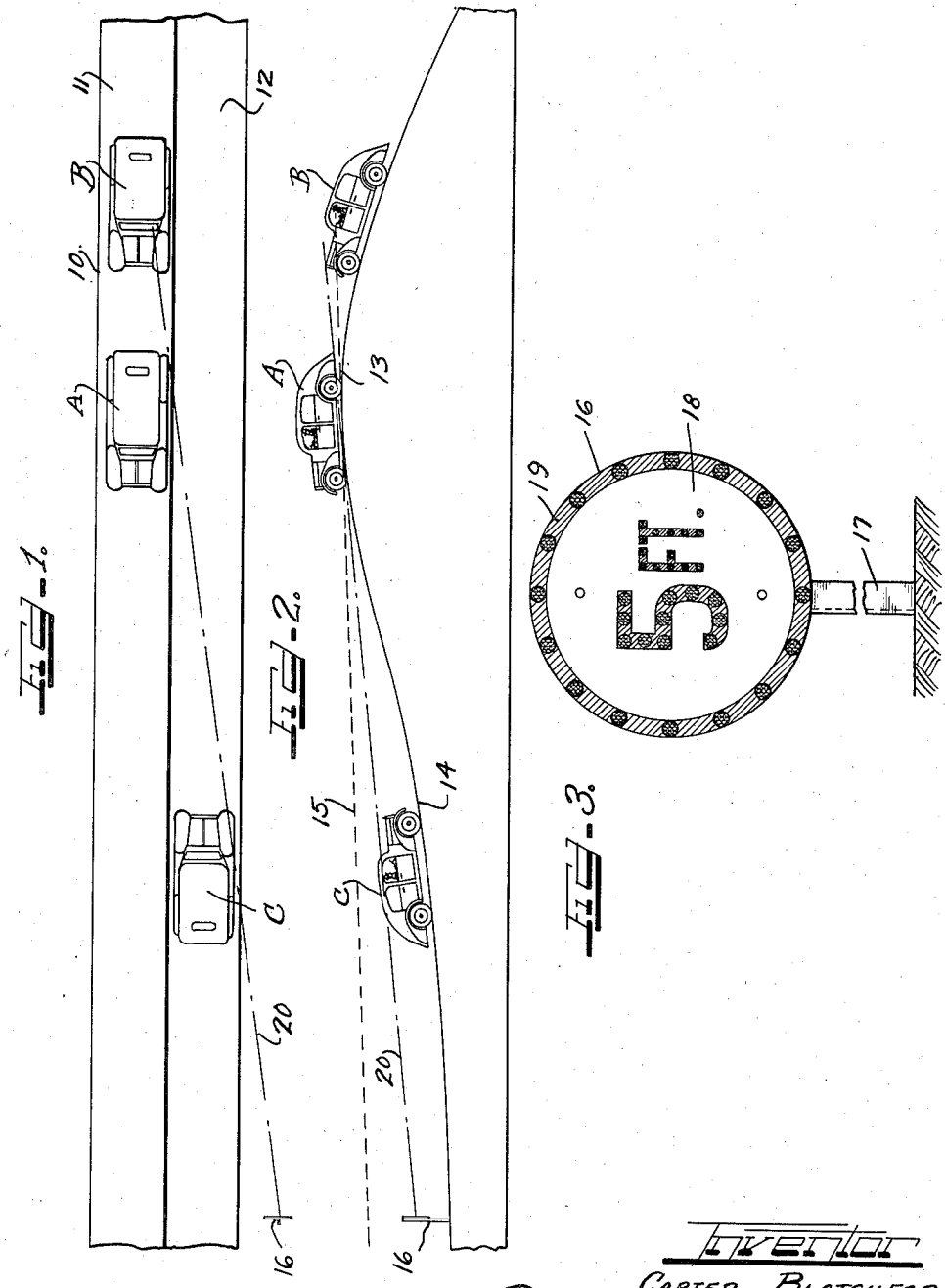

Patented Aug. 9, 1938

2,126,165

UNITED STATES PATENT OFFICE 2,126,165

METHOD OF AND MEANS FOR MARKING A HIGHWAY

Carter Blatchford, Chicago, Ill.

Application November 13, 1936, Serial No. 110,568

2 Claims. (Cl. 94—1.5)

The present invention relates in general to an indicating device and is more specifically concerned with a novel indicator for a highway and the method of using the same, whereby the driving of a vehicle such as an automobile may be rendered more safe and the hazards of driving materially lessened.

Most motorists have at some time experienced the condition, while driving on a highway, where it was desired to pass a car ahead, and the highway ahead of this car appeared to be devoid of cars so that the car ahead could be passed with apparent safety. But, upon drawing abreast of the car ahead, there would suddenly appear an oncoming car on the left side of the highway; this car having previously been concealed from view in a depression in the highway of a depth greater than that of the oncoming car. Under these conditions, two courses are open to the driver of the passing car. The driver may increase his speed and attempt to pass around the car ahead, or may slacken his speed and drop behind the car he is endeavoring to pass. In either event, if the oncoming car is very close, which is very often the case, a hazardous and dangerous condition presents itself, and a serious accident may result.

The present invention seeks to prevent the occurrence of a hazardous condition of this sort and therefore has for one of its primary objects the provision of means whereby a driver of a vehicle may be warned as to whether or not the highway ahead deviates sufficiently to conceal a car from his view.

A further object is to provide means for establishing a predetermined line of sight from the driver of a vehicle, which will at all points be of a height above the highway that is less than the height of a vehicle, whereby the driver may know that there is no depression subtending the line of sight which is of sufficient depth to conceal a car from his view.

A still further object of the invention is to provide a novel method for marking a highway and means whereby the method may be practiced.

Although the present invention will hereinafter be described in connection with a highway having vertical variations such as raised and depressed portions, it will be readily apparent to those skilled in the art that the device and method may with equal facility be utilized in connection with horizontal deviations of the highway without departing from the scope and spirit of the present invention.

Other objects of this invention will more fully appear from the following detailed description taken in connection with the accompanying drawing, which illustrates a single embodiment thereof, and in which:

Figure 1 is a plan view illustrating means for carrying out the method of the herein described invention;

Figure 2 is an elevational view of the same; and

Figure 3 is a view illustrating the details of a highway marking device utilized in the present invention.

As shown on the drawing:

In the illustrated embodiment of the present invention, there is shown in Figure 1 a portion of a longitudinal section of a highway 10 which in this instance is shown as comprising two traffic lanes 11 and 12.

Looking at Figure 2, it will be observed that in elevation this highway section embodies a raised or hill portion 13 which continues on one side of the hill into a depression or lowered portion of the highway as shown at 14.

In order that the present invention may be clearly understood, a vehicle such as an automobile A is shown substantially at the top or highest point of the hill or raised portion 13 of the highway. A second vehicle or automobile B is shown in a position following the automobile A, automobile B approaching the top of the hill.

Let it now be assumed that automobile B desires to pass the automobile A. In the relative positions of the automobiles as shown, it will be apparent that the driver of automobile B is unable to determine before passing the car ahead, whether or not the depression on the other side of the hill is sufficiently deep to conceal an oncoming car, as shown at C, from his view. For this reason, it has in general been considered a dangerous practice to attempt to pass a vehicle on a hill. However, it is very often the case that the driver of the car wishing to pass, takes a chance and determines to pass the car ahead, for example, the car B determines to pass the car A.

The line of sight of the driver of car A is indicated by the line 15 which is at such height relative to the depression, that the driver of car B is unable to see the oncoming car C. However car B draws along to the left of car A in attempting to pass it. At this point it is very often the case that in such position, there will suddenly appear an oncoming car. Under such conditions the driver of car B may either increase his speed and endeavor to pass around the car ahead before the oncoming car gets too close, or may decide to slacken the speed of his car and again drop behind the car he is attempting to pass. In either case, a hazardous condition results and it is very often the case that there is not sufficient time for the passing car to either move ahead or behind the car it is attempting to pass, with the result that a very bad accident may occur.

In order to lessen the hazards of driving under such conditions and warn the driver of an automobile when it is safe to pass a car ahead, when a depression in the highway is being approached, the present invention provides a marker or indicator as generally shown at 16. This indicator comprises a vertical support 17 which may be constructed of any suitable material such as angle iron. Secured to the upper end of the support, preferably at a height which is less than the height of the ordinary vehicle, is a circular plate or disc 18 having its forward surface finished in any suitable manner to provide a white background. A green border 19 is provided on the forward surface of this plate and also in the central portion of the plate there is disposed a large numeral such as the numeral "5" and the abbreviation "Ft." for feet. The numeral and abbreviation are both finished in green the same as the border.

Although in practice different colors might be used for the plate border, the numeral and the abbreviation for feet, it is desirable to use the color green for the reason that this color is usually recognized in safety signals to indicate that it is safe to proceed.

In order that the plate may be rendered more easily visible at night, the border and indicia at the central portion of the plate are outlined by means of green reflecting buttons which are disposed in spaced apart relationship.

The indicia at the central portion of the plate, namely, "5 Ft." not only forms a particular identifying indicia, but also indicates the height of the central portion of the disc or plate above the ground where the indicator is mounted. As shown in Figure 1, it is proposed to mount this indicator or marker on the left side of the highway relative to a car traveling on the right side of the highway. This marker is so placed relative to the raised and depressed portions of the highway that when a car traveling on the right side of the highway reaches such a point that the driver's line of sight tangent to the raised portion of the highway and passing through the marker will define a subtending depression and the height of the line of sight above the bottom of this depression will in no instance be greater than the height of the car. When a car approaching the depression, as car B in the illustration shown in Figures 1 and 2, is able to establish a line of sight 20 through the marker, the driver of this car immediately knows that there is no depression in the highway between his car and the marker, which is of sufficient depth to conceal an oncoming car. The driver is thus advised as to the condition of the highway ahead and knows that it is safe for him to proceed, and if there is a car ahead this car may be passed with safety. On the other hand, when the position of car B is such that the line of sight would be 15, as shown in Figure 2, in which case the marker is not visible, the driver of car B would immediately know that the depression ahead of him might conceal a car and that it is therefore unsafe for him to endeavor to pass a car ahead.

From the foregoing description it will be apparent that the present invention provides an improved method for marking a highway and includes means for carrying out this method, whereby a driver of a vehicle may be warned as to whether or not the highway ahead deviates sufficiently to conceal a car from his view; improved means for establishing a predetermined line of sight from the driver of a vehicle, which will at all points be of a height above the highway that is less than the height of a vehicle, whereby the driver may know that there is no depression subtending the line of sight which is of sufficient depth to conceal a car from his view; and improved means for establishing the predetermined line of sight, this means being mounted on the left side of the road relative to a vehicle driving on the right side of the road and approaching a depressed portion of the road.

It of course to be understood that although I have described in detail the preferred embodiment of my invention, the invention is not to be thus limited, but only insofar as defined by the scope and spirit of the appended claims.

I claim as my invention:

1. In a highway having a curved elevation, a signal elevated above the highway at a height such that a tangent drawn from the top of such elevation to the signal shall be elevated at no place above the highway to a greater distance than the height of a vehicle, said signal being positioned at a distance from the top of said elevation such as to indicate sufficient opportunity for passing an intervening vehicle.

2. In a curved highway presenting an elevated portion followed by a depressed portion, a signal disposed above the highway at a height such that a line of sight extending between said elevated portion and said signal and substantially tangent to said elevated portion shall at no place be elevated above the highway to a greater distance than the height of a vehicle, said signal being positioned on the left of a vehicle descending the elevated portion in approaching it and being positioned at a distance from the top of said elevated portion such as to indicate sufficient opportunity for passing an intervening vehicle when the line of sight is not intercepted.

CARTER BLATCHFORD.